(12) United States Patent
Yao et al.

(10) Patent No.: US 8,269,423 B2
(45) Date of Patent: Sep. 18, 2012

(54) LED DRIVERS WITH ADAPTIVE HYSTERETIC CONTROL CIRCUITS AND ASSOCIATED METHODS OF OPERATION

(75) Inventors: Kaiwei Yao, San Jose, CA (US); Naixing Kuang, Hangzhou (CN); Edward Deng, Cupertino, CA (US)

(73) Assignee: Monolithic Power Systems, Inc., San Jose, CA (US)

(*) Notice: Subject to any disclaimer, the term of this patent is extended or adjusted under 35 U.S.C. 154(b) by 235 days.

(21) Appl. No.: 12/879,804

(22) Filed: Sep. 10, 2010

(65) Prior Publication Data
US 2012/0062144 A1  Mar. 15, 2012

(51) Int. Cl.
*H05B 37/00* (2006.01)
(52) U.S. Cl. ............ 315/224; 315/209 R; 315/291; 315/307; 315/247
(58) Field of Classification Search .......... 315/224, 315/225, 209 R, 291, 307, 247
See application file for complete search history.

(56) References Cited

U.S. PATENT DOCUMENTS
2012/0146533 A1* 6/2012 Park .............................. 315/224
* cited by examiner

*Primary Examiner* — Tuyet Thi Vo
(74) *Attorney, Agent, or Firm* — Perkins Coie LLP

(57) ABSTRACT

Various embodiments of LED drivers and associated methods of are described below. In one embodiment, a method for controlling an LED driver includes receiving a reference voltage, receiving a feedback voltage from said LED driver, receiving said input voltage as a first feed forward voltage and said output voltage as a second feed forward voltage, generating a hysteretic width based on said first feed forward voltage and said second feed forward voltage, and generating a hysteretic band voltage using said hysteretic width and said reference voltage. The method also includes generating a first control signal for controlling said LED driver based on said hysteretic band voltage and said feedback voltage, inverting said first control signal to generate a second control signal for controlling said LED driver, and achieving a generally fixed frequency for said LED driver.

18 Claims, 8 Drawing Sheets

LED DRIVERS WITH ADAPTIVE HYSTERETIC CONTROL CIRCUITS AND ASSOCIATED METHODS OF OPERATION

TECHNICAL FIELD

The present disclosure relates to light emitting diode (LED) drivers, and more particularly, to adaptive hysteretic control circuits and methods thereof for LED drivers with a buck converter.

BACKGROUND

In some system designs, a fixed frequency is required. For example, a fixed frequency is needed to reduce electromagnetic interference (EMI) in some portable devices. One prior art solution is to use a clock circuit, a ramp compensation circuit and an amplifier to form a closed loop to obtain the fixed frequency. The drawback of this conventional solution includes, but is not limited to, a slow regulation speed.

Another existing solution is to use an adaptive constant on time control with an input voltage feed forward. This solution can almost achieve a fixed frequency. However, it regulates an inductor valley current so that the accuracy of the LED current regulation is typically not good. In addition, a load step down transient may have a big overshoot due to the constant on time.

FIG. 1 shows a circuit 10 illustrating a conventional hysteretic control circuit 100 for an LED driver with a buck converter. As shown in FIG. 1, an input voltage $V_{in}$ is provided to a first terminal of a high side switch $Q_1$ whose second terminal is electrically coupled to a first terminal of a low side switch $Q_2$. A second terminal of the low side switch $Q_2$ is electrically coupled to the ground. An inductor L is electrically coupled between a node SW formed by the second terminal of the high side switch $Q_1$ and the first terminal of the low side switch $Q_2$ and an output voltage port which provides a regulated output voltage $V_o$ to an LED string. A capacitor $C_o$ is electrically coupled between a first terminal and a second terminal of the LED string. A sensing resistor $R_{sensed}$ is electrically coupled between the second terminal of the LED string and the ground.

The hysteretic control circuit 100 comprises a fixed hysteretic width production circuit 101, a comparator CMP, an inverter INV and a hysteretic band voltage generating circuit 102. As shown in FIG. 1, the inductor current $I_L$ is sensed by the sensing resistor $R_{sensed}$ across which the voltage drop acts as a sensing voltage $V_s$ to be compared by the comparator CMP with a hysteretic band voltage which comprises a high hysteretic band voltage V_h by adding half of a hysteretic width $\Delta V$ generated by the fixed hysteretic width production circuit 101 with a reference voltage $V_{ref}$ and a low hysteretic band voltage V_l by subtracting half of the hysteretic width $\Delta V$ from the reference voltage $V_{ref}$. When $V_s$ is lower than V_l ($V_s$<V_l), the comparator CMP outputs a high level to turn on $Q_1$ and to turn off $Q_2$ with a low level which is generated by inverting the high level with the inverter INV. Accordingly, the inductor current $I_L$ and the sensing voltage $V_s$ start to increase. When $V_s$ increases to such a point that it is higher than V_h ($V_s$>V_h), the comparator CMP outputs a low level to turn off $Q_1$ and meanwhile to turn on $Q_2$ through the inverter INV. Accordingly, the inductor current $I_L$ and the sensing voltage $V_s$ start to decrease. When $V_s$ decreases to be lower than V_l ($V_s$<V_l) again, the comparator CMP outputs a high level to turn on $Q_1$ and to turn off $Q_2$ through the inverter INV. A new control cycle begins.

The on time $T_1$ and the off time $T_2$ of the high side switch $Q_1$ are determined by the hysteretic width $\Delta V$, the inductor L, the input voltage $V_{in}$, the output voltage $V_o$ and the sensing resistor $R_{sensed}$, following the equations below:

$$\Delta I = \Delta V / R_{sensed} \qquad (1)$$

$$T_1 = (L \times \Delta I)/(V_{in} - V_o) \qquad (2)$$

$$T_2 = (L \times \Delta I)/V_o \qquad (3)$$

Thus, the switching period $T_s$ of the switches can be written as:

$$T_s = T_1 + T_2 = (L \times \Delta V \times V_{in})/(R_{sensed} \times (V_{in} - V_o) \times V_o) \qquad (4)$$

In a particular application, the sensing resistor $R_{sensed}$ is determined by a setting LED current, and the inductor L is determined by the inductor current ripple and the output voltage $V_o$ is expected to be constant. So the switching period $T_s$ is dependent of the input voltage $V_{in}$ and the hysteretic width $\Delta V$.

For the conventional hysteretic control circuit for an LED driver with a buck converter shown in FIG. 1, the hysteretic width $\Delta V$ is a fixed value generated by the fixed hysteretic width production circuit 101, so the switching period $T_s$ is only dependent of the input voltage $V_{in}$. When $V_{in}$ changes, $T_s$ changes accordingly. That is to say, the switching frequency $F_s = 1/T_s$ changes in response to the input voltage $V_{in}$. FIG. 2 shows a waveform diagram illustrating examples of signals in the conventional hysteretic control circuit shown in FIG. 1. The signals from top to bottom are followed by the sensing voltage $V_s$, the voltage $V_{SW}$ at the node SW and the inductor current $I_L$. Accordingly, improved hysteretic control circuits and methods thereof for LED drivers are needed.

BRIEF DESCRIPTION OF THE DRAWINGS

In the Figures, identical or similar components are designated by the same or similar reference numerals throughout.

DETAILED DESCRIPTION

Various embodiments of LED drivers and associated methods are described below. In the following detailed description of the present technology, numerous specific details are set forth in order to provide a thorough understanding of the present technology. However, it will be obvious to one of ordinary skill in the art that the present technology may be practiced without these specific details. In other instances, well-known methods, procedures, components, and circuits have not been described in detail so as not to unnecessarily obscure aspects of the present technology. A person skilled in the relevant art will also understand that the technology may have additional embodiments, and that the technology may be practiced without several of the details of the embodiments described below with reference to FIGS. 3-8.

Figure 1:
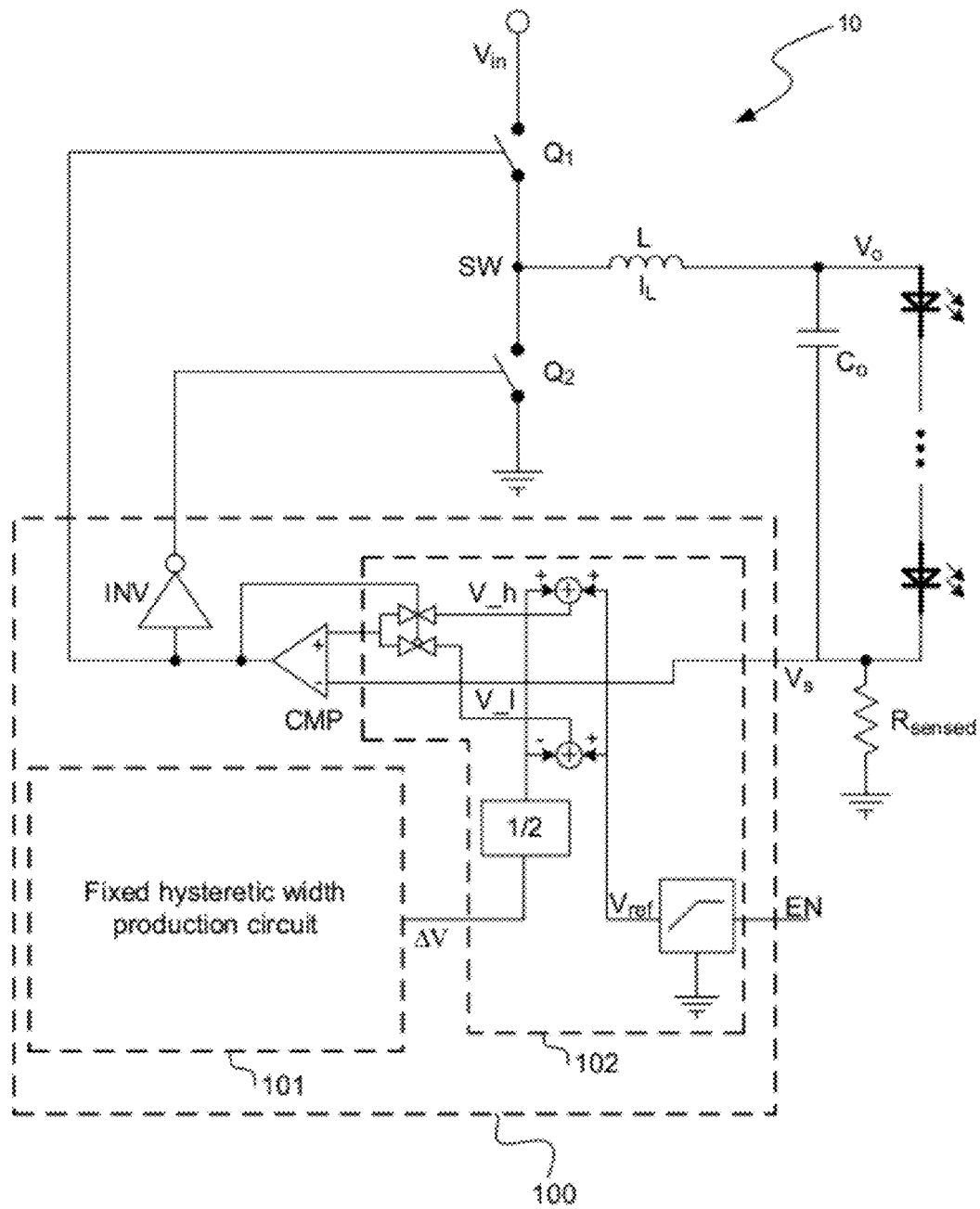
FIG. 1 shows a conventional hysteretic control circuit for an LED driver with a buck converter.
Figure 2:
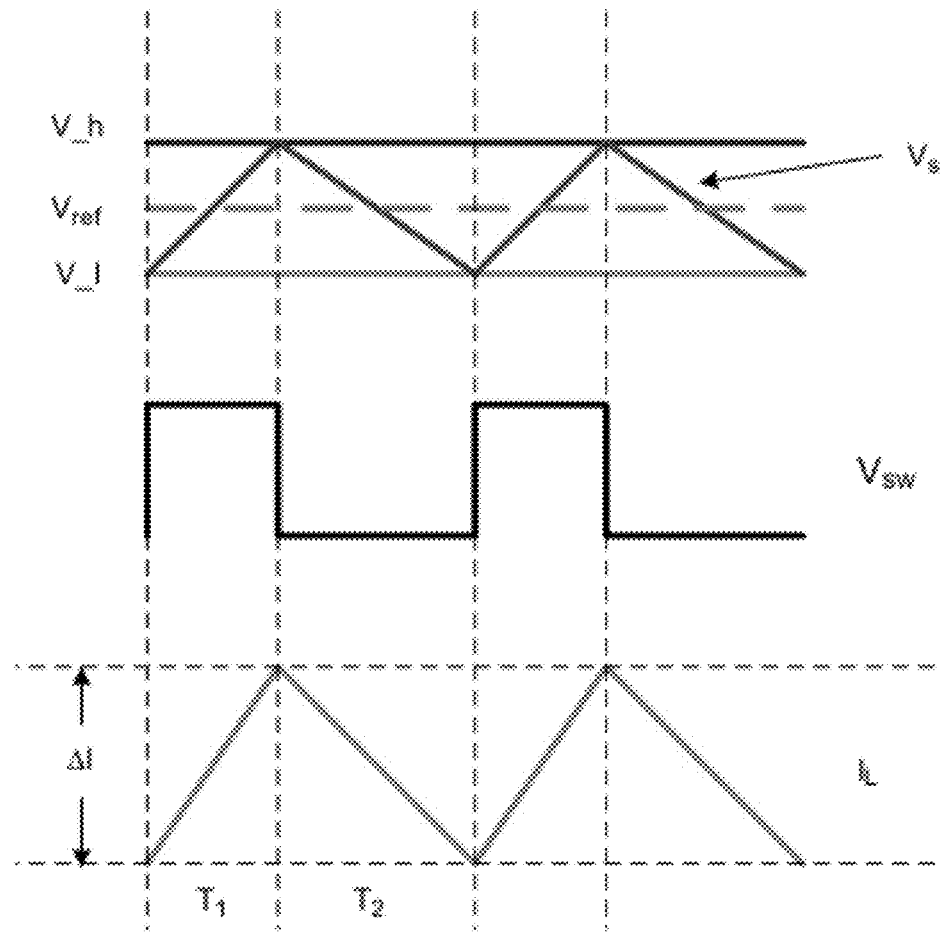
FIG. 2 shows a waveform diagram illustrating examples of signals in the conventional hysteretic control circuit shown in FIG. 1.
Figure 3:
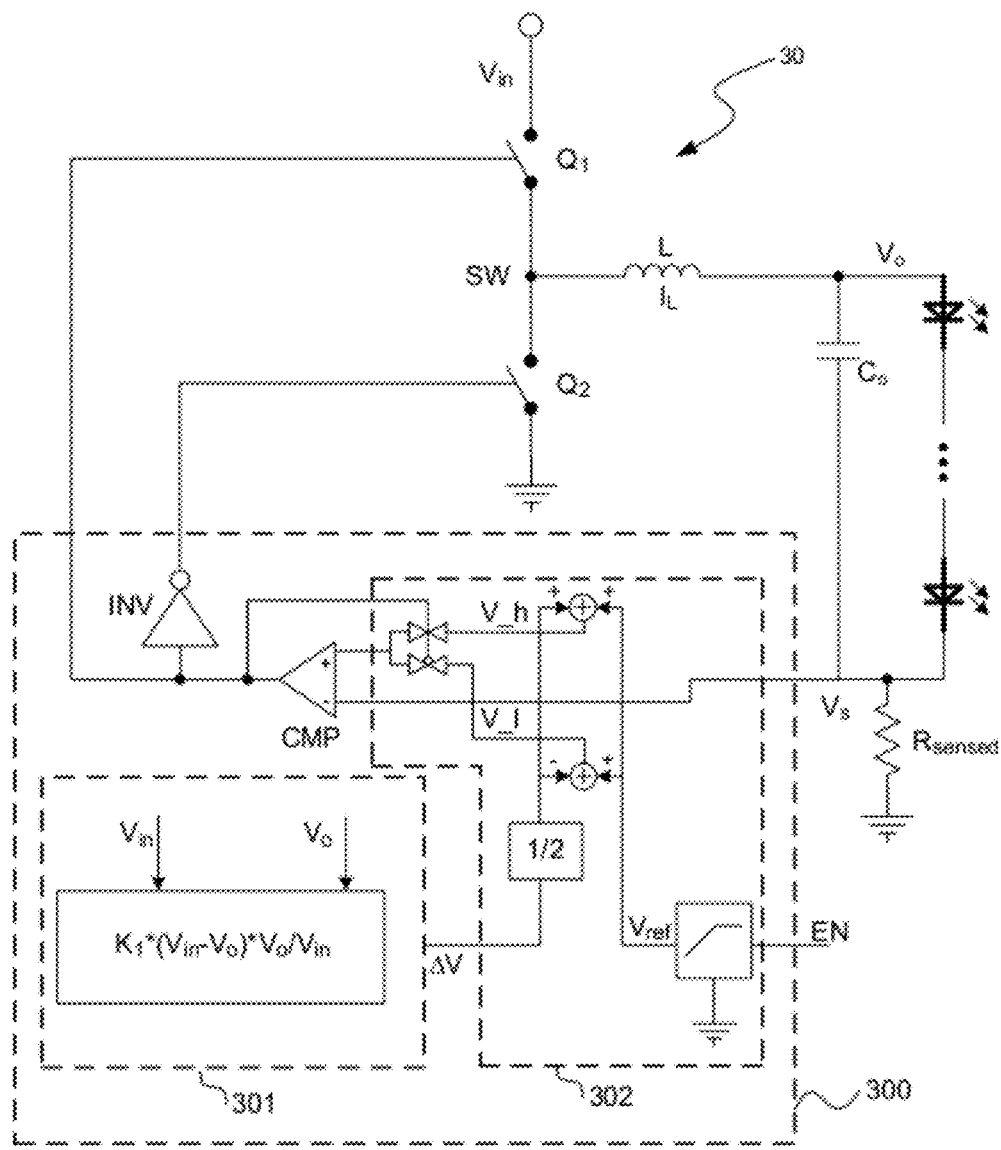
FIG. 3 shows an adaptive hysteretic control circuit for an LED driver with a buck converter according to an embodiment of the present technology.

FIG. 3 shows a circuit 30 illustrating an adaptive hysteretic control circuit 300 for an LED driver with a buck converter according to an embodiment of the present technology. The components of the circuit 30 are connected in a manner similar to that described above in connection with FIG. 1 except that an adaptive hysteretic width production circuit 301 replaces the fixed hysteretic width production circuit 101.

As shown in FIG. 3, the adaptive hysteretic control circuit 300 comprises the adaptive hysteretic width production circuit 301 which receives an input voltage $V_{in}$ as a first feed forward voltage and an output voltage $V_o$ as a second feed forward voltage and provides an adaptive hysteretic width $\Delta V$. The adaptive hysteretic width $\Delta V$ changes in response to $V_{in}$ and $V_o$ following the equation below:

$$\Delta V = K_1 \times (V_{in} - V_o) \times V_o / V_{in} \qquad (5)$$

wherein $K_1$ is a proportional factor which is a fixed value with a certain integrated circuit (IC) design. Thus, according to the equations (1) to (4) described above, the switching period $T_s$ is:

$$T_s = K_1 \times L / R_{sensed} \qquad (6)$$

The switching frequency $F_s$ is:

$$F_s = R_{sensed} / (L \times K_1) \qquad (7)$$

As evident from the equation (7), the switching frequency $F_s$ is independent of the input voltage $V_{in}$ and is a fixed value only decided by the inductor L or the sensing resistor $R_{sensed}$.

Figure 4:
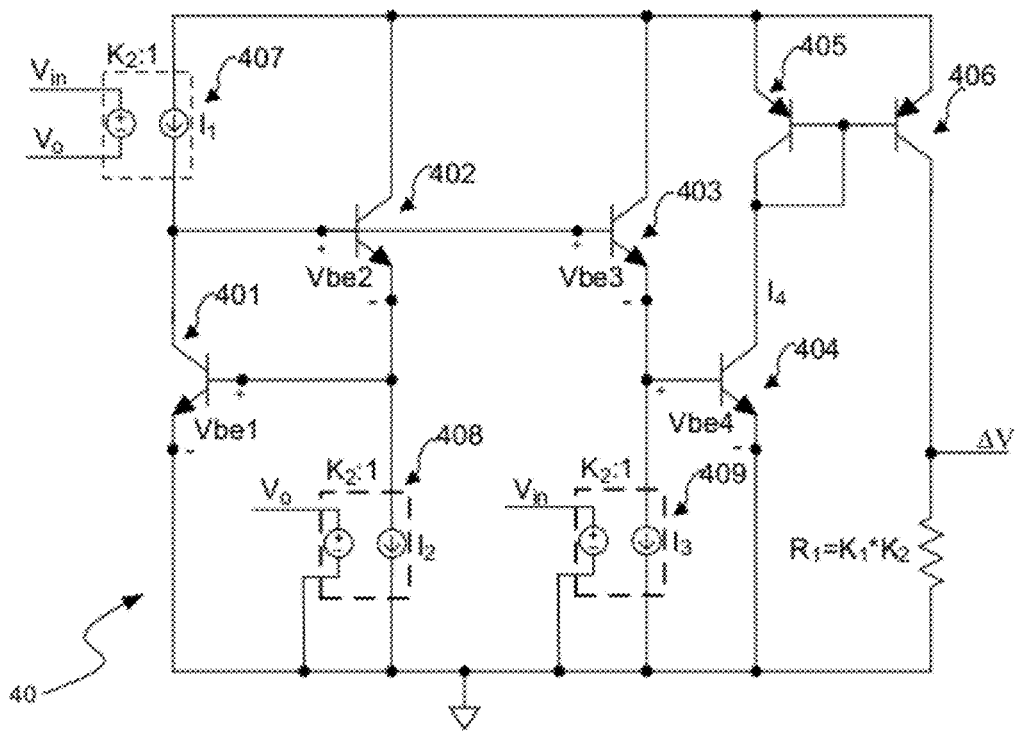
FIG. 4 shows a hysteretic width production circuit for the adaptive hysteretic control circuit shown in FIG. 3.

Referring to FIG. 4, an adaptive hysteretic width production circuit 40 according to an embodiment of the present technology is illustrated and may be used in the circuit 30 as the adaptive hysteretic width production circuit 301. As shown in FIG. 4, the adaptive hysteretic width production circuit 40 comprises a first transistor 401, a second transistor 402, a third transistor 403, a forth transistor 404, a first current source 407, a second current source 408, a third current source 409, a first resistor $R_1$ and a first current mirror comprising a first PNP transistor 405 and a second PNP transistor 406. A current input terminal of the first current source 407 is electrically coupled to collectors of the second transistor 402 and the third transistor 403 and emitters of the first PNP transistor 405 and the second PNP transistor 406, a current output terminal of the first current source 407 is electrically coupled to a collector of the first transistor 401 and bases of the second transistor 402 and the third transistor 403, a base of the first transistor 401 is electrically coupled to an emitter of the second transistor 402 and a current input terminal of the second current source 408, an emitter of the third transistor 403 is electrically coupled to a base of the forth transistor 404 and a current input terminal of the third current source 409, a collector of the forth transistor 404 is electrically coupled to a collector of the first PNP transistor 405, a first terminal of the first resistor $R_1$ is electrically coupled to a collector of the second PNP transistor 406, an emitter of the first transistor 401, current output terminals of the second current source 408 and the third current source 409, an emitter of the forth transistor 404 and a second terminal of the first resistor $R_1$ are electrically coupled commonly to the ground.

As shown in FIG. 4, the output current of 407 is proportional to the difference between the input voltage $V_{in}$ and the output voltage $V_o$ with a proportional factor $K_2$. The output current of 408 is proportional to $V_o$ with the proportional factor $K_2$. The output current of 409 is proportional to $V_{in}$ with the proportional factor $K_2$. The resistor $R_1$ equals to the proportional factor $K_1$ multiplied by the proportional factor $K_2$. The hysteretic width $\Delta V$ is the voltage drop across the resistor $R_1$ which is referred to as the output voltage of the adaptive hysteretic width production circuit 40.

As shown in FIG. 4, the currents $I_1$ of the current source 407, $I_2$ of the current source 408, $I_3$ of the current source 409 and the output current $I_4$ of the current mirror are respectively approximate equal to the emitter currents of transistors 401, 402, 403 and 404:

$$I_1 = I_{ES} \times e^{Vbe1/VT} \qquad (8)$$

$$I_2 = I_{ES} \times e^{Vbe2/VT} \qquad (9)$$

$$I_3 = I_{ES} \times e^{Vbe3/VT} \qquad (10)$$

$$I_4 = I_{ES} e^{Vbe4/VT} \qquad (11)$$

Where $I_{ES}$ is an emitter inverse saturation current, VT is a temperature equivalent voltage and Vbe1, Vbe2, Vbe3, Vbe4 are respectively base-emitter voltages of the transistors 401, 402, 403, and 404.

Thus, $$I_1 \times I_2 = I_{ES}^2 \times e^{(Vbe1+Vbe2)/VT} \qquad (12)$$

$$I_3 \times I_4 = I_{ES}^2 \times e^{(Vbe3+Vbe4)/VT} \qquad (13)$$

As can be seen from FIG. 4, there exist:

$$V_{be1} + V_{be2} = V_{be3} + V_{be4} \qquad (14)$$

Thus, $$I_4 = I_1 \times I_2 / I_3 \qquad (15)$$

For the current sources 407, 408 and 409, there respectively exists:

$$I_1 = (V_{in} - V_o)/K_2,\ I_2 = V_o/K_2,\ I_3 = V_{in}/K_2 \qquad (16)$$

From the equations (15) and (16), the current $I_4$ can be expressed as:

$$I_4 = (V_{in} - V_o) \times V_o / (K_2 \times V_{in}) \qquad (17)$$

Because:

$$\Delta V = I_4 \times R_1 = ((V_{in} - V_o) \times V_o \times R_1)/(K_2 \times V_{in}) \qquad (18)$$

Also because $R_1 = K_1 \times K_2$, there exists:

$$\Delta V = I_4 \times R_1 = K_1 \times (V_{in} - V_o) \times V_o / V_{in} \qquad (19)$$

As evident from the above equation (19), a hysteretic width $\Delta V$ can be achieved by choosing $R_1 = K_1 \times K_2$ to form a fixed switching frequency $F_s$ independent of the input voltage $V_{in}$.

Figure 5:
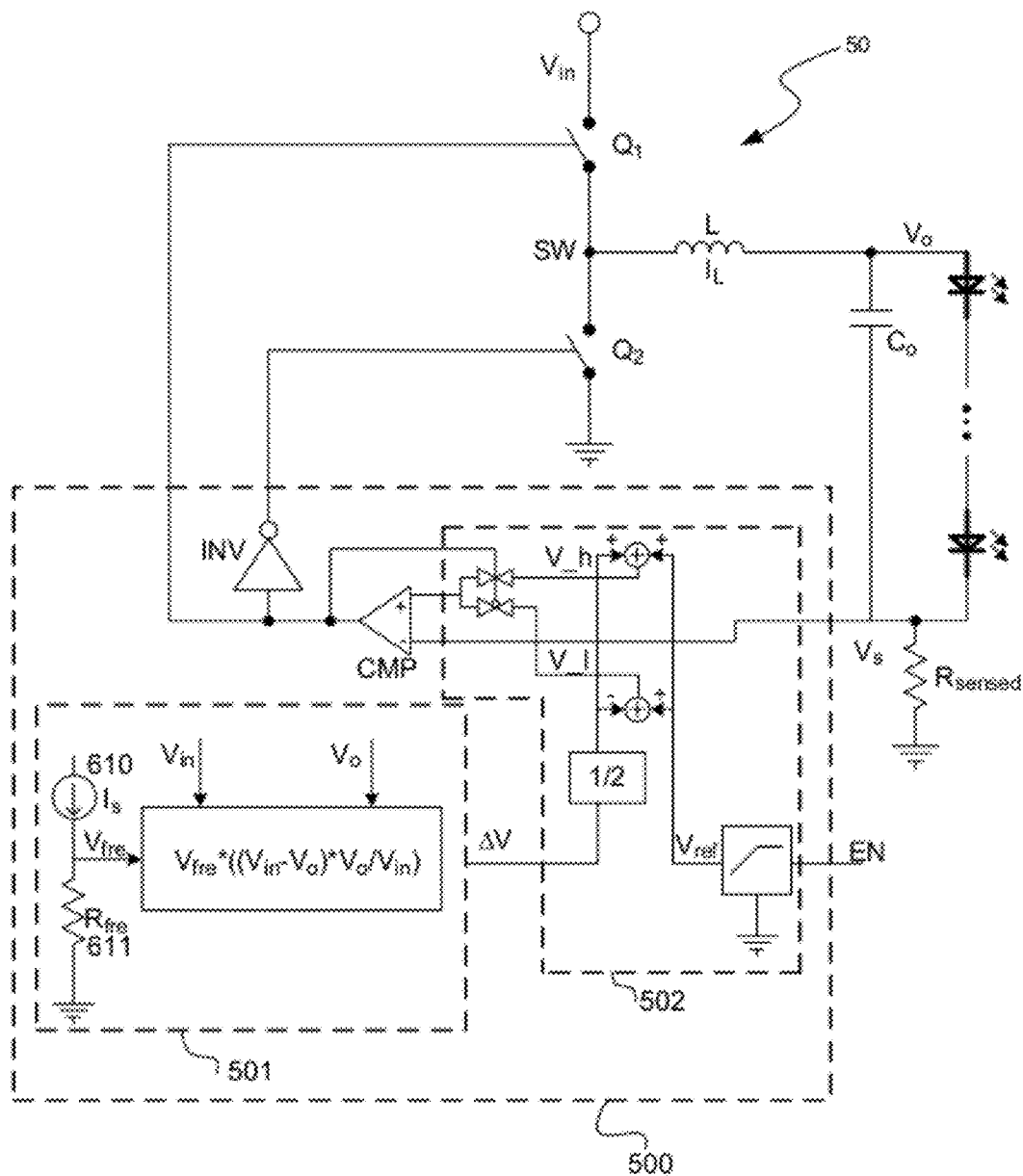
FIG. 5 shows an adaptive hysteretic control circuit for an LED driver with a buck converter according to another embodiment of the present technology.

FIG. 5 shows a circuit 50 illustrating an adaptive hysteretic control circuit 500 for an LED driver with a buck converter according to another embodiment of the technology. The components of the circuit 50 are electrically coupled in a manner similar to that described above in connection with FIG. 1 and FIG. 3 except for the addition of a current source 510 and a frequency setting resistor 511. In the circuit 50, the hysteretic width $\Delta V$ is:

$$\Delta V = V_{fre} \times ((V_{in} - V_o) \times V_o / V_{in}) = I_s \times R_{fre} \times ((V_{in} - V_o) \times V_o / V_{in}) \qquad (20)$$

where $I_s$ is the output current of the current source 610 and $R_{fre}$ is the resistance value of the frequency setting resistor

611. Therefore, according to equations (4) and (20), the switching period $T_s$ can be written as:

$$T_s = T_1 + T_2 = L \times I_s \times R_{fre}/R_{sensed} \quad (21)$$

Accordingly, the switching frequency $F_s$ can be written as:

$$F_s = R_{sensed}/(L \times I_s \times R_{fre}) \quad (22)$$

As evident from equation (22), in this circuit 50, with a given current $I_s$, a fixed inductor L and a fixed resistor $R_{sensed}$, the switching frequency $F_s$ is fixed when the input voltage $V_{in}$ changes. Furthermore, the switching frequency $F_s$ can be programmed by changing the resistance value $R_{fre}$ of the frequency setting resistor 611.

Figure 6:
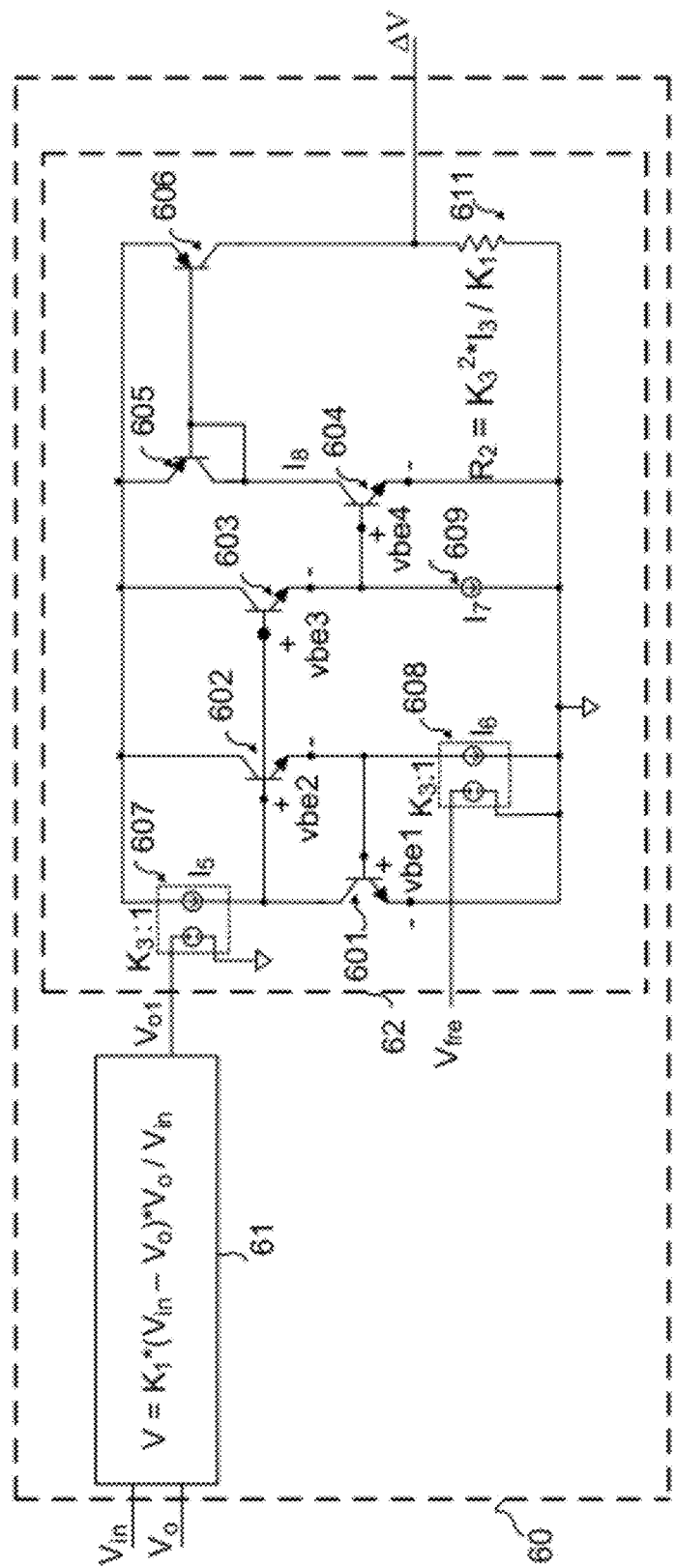
FIG. 6 shows a hysteretic width production circuit for the adaptive hysteretic control circuit shown in FIG. 5.

Referring to FIG. 6, an adaptive hysteretic width production circuit 60 according to an embodiment of the present technology is illustrated and may be used in the circuit 50 as the adaptive hysteretic width production circuit 501. The adaptive hysteretic width production circuit 60 comprises the adaptive hysteretic width production circuit 40 (referring as the first hysteretic width production circuit 61 thereafter) as shown in FIG. 4 and further comprises a second adaptive hysteretic width production circuit 62. The second adaptive hysteretic width production circuit 62 has a similar configuration with the first hysteretic width production circuit 61. Compared to 61, the output current $I_5$ of 607 is proportional to the output voltage $V_{o1}$ of the first hysteretic width production circuit 61 with a proportional factor $K_3$. The output current $I_6$ of 608 is proportional to $V_{fre}$ with the proportional factor $K_3$. The output current $I_7$ of 609 is a constant value. The resistor $R_2$ equals to the square of the proportional factor $K_3$ multiply the output current $I_7$ of the current source 609 over the proportional factor $K_1$. The hysteretic width $\Delta V$ is the voltage drop across the resistor $R_2$.

Referring to FIG. 4 and FIG. 6, according to the similar derivation as expressed by equations (8) to (17), an output current $I_8$ of the current mirror in the second adaptive hysteretic width production circuit 62 can be expressed as:

$$I_8 = I_5 \times I_6/I_7 = (V_{o1}/K_3) \times (V_{fre}/K_3)/I_7 = (K_1 \times (V_{in} - V_o) \times V_o \times I_s \times R_{fre}/V_{in})/(K_3^2 \times I_7) \quad (23)$$

The hysteretic width $\Delta V$ can be written as:

$$\Delta V = R_2 \times I_8 = (K_1 \times (V_{in} - V_o) \times V_o \times I_s \times R_{fre}/V_{in}) \times (R_2/(K_3^2 \times I_7)) \quad (24)$$

Because $$R_2 = K_3^2 \times I_7/K_1 \quad (25)$$

Thus, the hysteretic width $\Delta V$ can be written as:

$$\Delta V = I_s \times R_{fre} \times (V_{in} - V_o) \times V_o/V_{in} \quad (26)$$

As evident from equation (26), a hysteretic width $\Delta V$ can be achieved by choosing $R_2 = K_3^2 \times I_3/K_1$ to form a fixed switching frequency $F_s$ independent of the input voltage $V_{in}$ and furthermore, the switching frequency $F_s$ can be programmed by changing the resistance value $R_{fre}$ of the frequency setting resistor 611 even with a fixed inductor L and a fixed resistor $R_{sensed}$.

Figure 7:
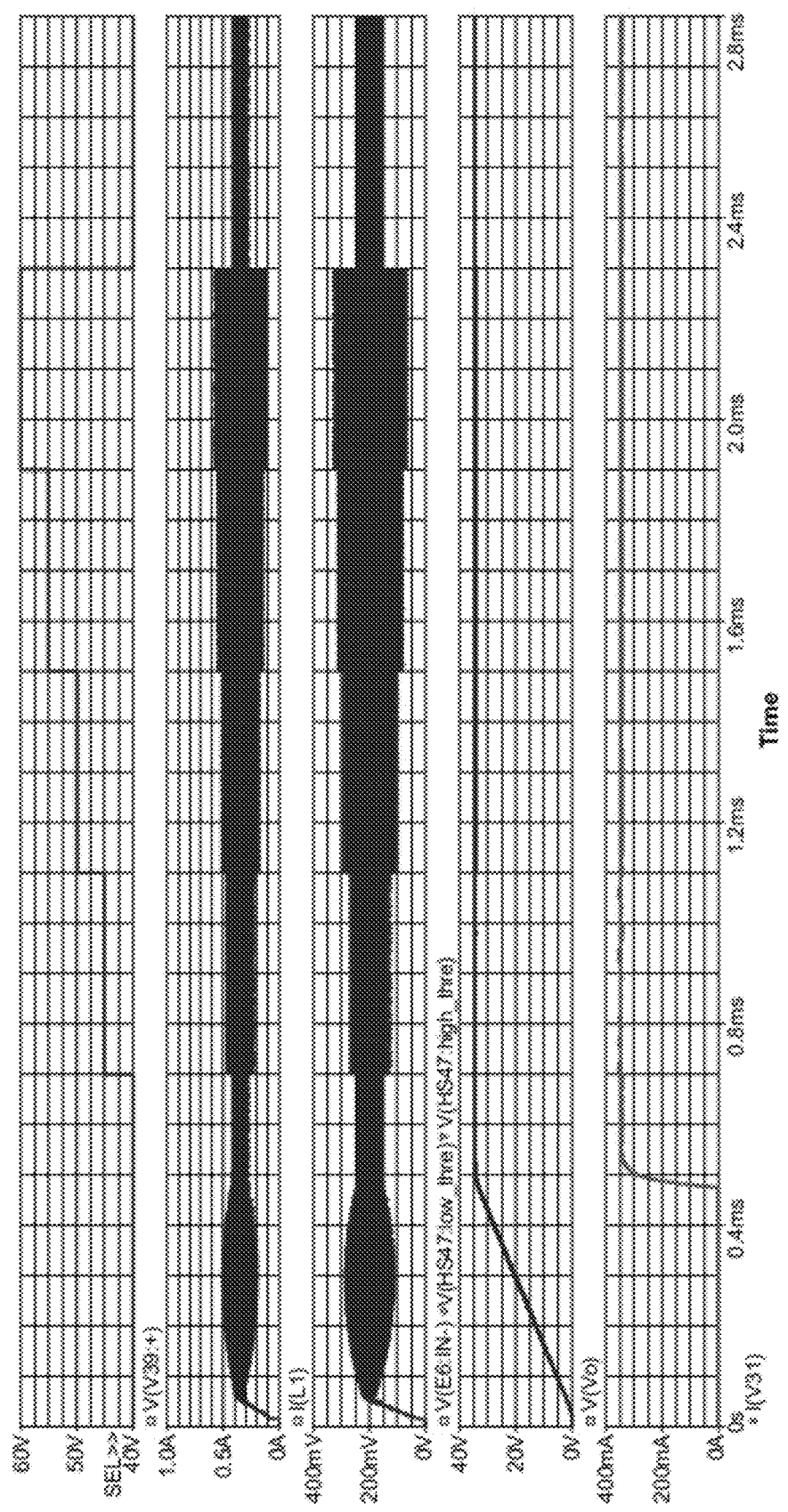
FIG. 7 shows a waveform diagram illustrating the simulation results of the signals of the adaptive hysteretic control circuit shown in FIG. 5.

FIG. 7 shows a waveform diagram illustrating the simulation results of the signals of the adaptive hysteretic control circuit shown in FIG. 5. Top trace is the input voltage $V_{in}$, below the input voltage $V_{in}$ is the inductor current $I_L$, the third trace is the sensing voltage $V_s$ and the forth trace is the output voltage $V_o$. The LED current is depicted by the bottom trace. As shown in FIG. 7, the hysteretic width changes when the input voltage changes.

Figure 8:
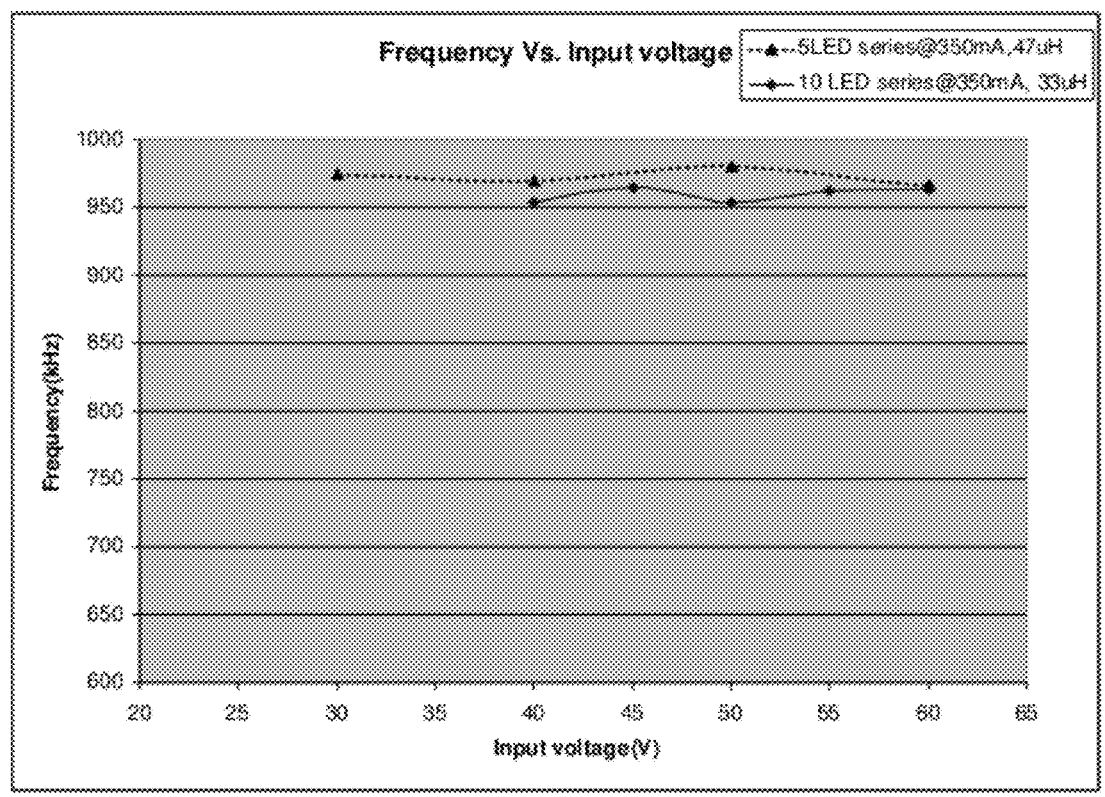
FIG. 8 shows a waveform diagram illustrating a frequency corresponding to an input voltage according to the adaptive hysteretic control circuit shown in FIG. 5.

FIG. 8 shows the switching frequency $F_s$ when the input voltage $V_{in}$ changes from 20V to 65V. The traces of the 5 LED series and the 10 LED series are respectively measured by using an inductor with an inductance of 47 uH and an inductor with an inductance of 33 uH. The traces of the 5 LED series and the 10 LED series are both measured when the LED current is 350 mA. As shown in FIG. 8, the switching frequency is basically kept in a constant value as the input voltage changes.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. For example, one of ordinary skill in the art will understand that in FIG. 3 and FIG. 5, the output capacitor $C_o$ is used to absorb the alternative current (AC) element of the inductor current $I_L$. However, the output capacitor $C_o$ can be removed in other embodiments. Also, the switches $Q_1$ and $Q_2$ can be any suitable types of switches, such as MOSFET, IGBT, and BJT. The low side switch $Q_2$ can also be replaced by a diode. Accordingly, the disclosure is not limited except as by the appended claims.

We claim:

1. A circuit for driving a plurality of light emitting diodes (LEDs), comprising:
    an input voltage port for providing an input voltage to said circuit;
    an output voltage port for providing an output voltage to said plurality of LEDs;
    a high side switch having a first terminal electrically coupled to said input voltage port;
    a low side switch having a first terminal electrically coupled in series to a second terminal of said high side switch such that said high side switch and said low side switch form a node, a second terminal of said low side switch being electrically coupled to ground;
    an inductor electrically coupled between said node and said output voltage port;
    a capacitor having a first terminal electrically coupled to said output voltage port;
    a resistor having a first terminal and a second terminal electrically coupled to ground, the first terminal of the resistor being electrically coupled to a second terminal of said capacitor; and
    control circuitry for receiving (1) a sensing voltage across said resistor and (2) a reference voltage and deriving a first control signal to control said high side switch and a second control signal to control said low side switch, wherein said control circuitry receives said input voltage as a first feed forward voltage and said output voltage as a second feed forward voltage, and wherein said control circuitry is configured to achieve a generally fixed frequency.

2. The circuit of claim 1, wherein said control circuitry comprises:
    a hysteretic width production circuit for providing a hysteretic width;
    a hysteretic band voltage generating circuit receiving said hysteretic width and said reference voltage and providing a hysteretic band voltage;
    a comparator receiving said sensing voltage and said hysteretic band voltage and providing said first control signal to control said high side switch; and
    an inverter for inverting said first control signal into said second control signal to control said low side switch.

3. The circuit of claim 2, wherein said hysteretic width production circuit comprises a first feed forward circuit, said first feed forward circuit receiving said first feed forward voltage and said second feed forward voltage and providing said hysteretic width.

4. The circuit of claim 3, wherein said hysteretic width is proportional to said second feed forward voltage and a voltage difference between said first feed forward voltage and said second feed forward voltage with a proportional factor and is inversely proportional to said first feed forward voltage.

5. The circuit of claim 4, wherein said proportional factor is a fixed value.

6. The circuit of claim 2, wherein said hysteretic width production circuit comprises a first feed forward circuit and a second feed forward circuit, said first feed forward circuit receiving said first feed forward voltage and said second feed forward voltage, said second feed forward circuit providing said hysteretic width.

7. The circuit of claim 6, wherein said hysteretic width production circuit further comprises a current source and a frequency setting resistor.

8. The circuit of claim 7, wherein said hysteretic width is proportional to a frequency setting voltage across said frequency setting resistor, said second feed forward voltage and a voltage difference between said first feed forward voltage and said second feed forward voltage being inversely proportional to said first feed forward voltage.

9. A control circuit for LED drivers receiving an input voltage and providing an output voltage to a plurality of LEDs comprising:
    a hysteretic width production circuit for providing a hysteretic width, wherein said hysteretic width production circuit is configured to receive said input voltage as a first feed forward voltage and to receive said output voltage as a second feed forward voltage, said hysteretic width being a function of said first feed forward voltage and said second feed forward voltage;
    a hysteretic band voltage generating circuit receiving said hysteretic width and said reference voltage and providing a hysteretic band voltage;
    a comparator receiving said sensing voltage and said hysteretic band voltage and providing said first control signal to control said LED driver; and
    an inverter for inverting said first control signal into said second control signal to control said LED driver.

10. The control circuit of claim 9, wherein said hysteretic width is proportional to said second feed forward voltage, and wherein a voltage difference between said first feed forward voltage and said second feed forward voltage has a proportional factor and is inversely proportional to said first feed forward voltage.

11. The control circuit of claim 10, wherein said proportional factor is a fixed value.

12. The control circuit of claim 10, wherein said hysteretic width production circuit further comprises a current source and a frequency setting resistor.

13. The control circuit of claim 12, wherein said proportional factor is a frequency setting voltage across said frequency setting resistor.

14. A method for controlling an LED driver with a buck converter receiving an input voltage and providing an output voltage to a plurality of LEDs, the method comprising:
    receiving a reference voltage;
    receiving a feedback voltage from said LED driver;
    receiving said input voltage as a first feed forward voltage and said output voltage as a second feed forward voltage;
    generating a hysteretic width based on said first feed forward voltage and said second feed forward voltage;
    generating a hysteretic band voltage using said hysteretic width and said reference voltage;
    generating a first control signal for controlling said LED driver based on said hysteretic band voltage and said feedback voltage;
    inverting said first control signal to generate a second control signal for controlling said LED driver; and
    achieving a generally fixed frequency for said LED driver.

15. The method of claim 14, wherein said hysteretic band voltage is a high hysteretic band voltage derived by adding said reference voltage with half of said hysteretic width.

16. The method of claim 14, wherein said hysteretic band voltage is a low hysteretic band voltage derived by subtracting half of said hysteretic width from said reference voltage.

17. The method of claim 16, wherein said hysteretic width is proportional to said second feed forward voltage, and wherein a voltage difference between said first feed forward voltage and said second feed forward voltage has a proportional factor and is inversely proportional to said first feed forward voltage.

18. The method of claim 17, wherein said proportional factor is a fixed value or a value set by user.

* * * * *